US007925384B2

(12) United States Patent
Huizenga et al.

(10) Patent No.: US 7,925,384 B2
(45) Date of Patent: Apr. 12, 2011

(54) LOCATION-BASED PROVISIONING OF WIRELESS CONTROL SYSTEMS

(75) Inventors: Charles A. Huizenga, Berkeley, CA (US); Alex Do, Berkeley, CA (US); Michael Corr, San Francisco, CA (US); Dale Fong, Alameda, CA (US); Josh Mooney, San Francisco, CA (US)

(73) Assignee: Adura Technologies, Inc., San Francisco, CA (US)

( * ) Notice: Subject to any disclaimer, the term of this patent is extended or adjusted under 35 U.S.C. 154(b) by 0 days.

(21) Appl. No.: 12/690,875

(22) Filed: Jan. 20, 2010

(65) Prior Publication Data

US 2010/0185339 A1 Jul. 22, 2010

Related U.S. Application Data

(63) Continuation of application No. 12/613,970, filed on Nov. 6, 2009, which is a continuation-in-part of application No. 12/156,621, filed on Jun. 2, 2008.

(51) Int. Cl.
*G05B 13/02* (2006.01)

(52) U.S. Cl. .......................... 700/277; 700/11; 315/149

(58) Field of Classification Search .................. 700/295, 700/2, 3, 4, 9, 11, 275, 277; 315/149, 150, 315/152, 156
See application file for complete search history.

(56) References Cited

U.S. PATENT DOCUMENTS 4,242,614 A 12/1980 Vatis et al.
4,323,820 A 4/1982 Teich
4,355,309 A 10/1982 Hughey et al.
4,358,717 A 11/1982 Elliott
4,454,509 A 6/1984 Buennagel et al.
4,686,380 A 8/1987 Angott
4,797,599 A 1/1989 Ference et al.
5,005,211 A 4/1991 Yuhasz
5,146,153 A 9/1992 Luchaco et al.
5,237,264 A 8/1993 Moeley et al.
5,248,919 A 9/1993 Hanna et al.
5,357,170 A 10/1994 Luchaco et al.
5,373,453 A 12/1994 Bae
5,471,063 A 11/1995 Hayes et al.
5,561,351 A 10/1996 Vrionis et al.
5,572,438 A 11/1996 Ehlers et al.
5,637,930 A 6/1997 Rowen et al.
5,770,926 A 6/1998 Choi et al.

(Continued)

OTHER PUBLICATIONS

Adams, J.T., "Wireless Sensors and Controls Make the Organic Building," May 2006, Proceedings of the 2006 IEEE Intl. Symposium on Electronics and the Environment, pp. 109-113.
Canovas, S. R., Chermont, M.G., and Cugnasaca, C.E., "Remote Monitoring and Actuation Based on LonWorks Technology," Jul. 2005, 2005 EFITA/WCCA Joint Congress on IT in Agriculture.
Gislason, D. and Gillman, T. "ZigBee Wireless Sensor Networks," Nov. 2004, Dr. Dobbs online journal, www.ddj.com/184405887.

(Continued)

*Primary Examiner* — Albert Decady
*Assistant Examiner* — Douglas S Lee
(74) *Attorney, Agent, or Firm* — Carr & Ferrell LLP

(57) ABSTRACT

Exemplary systems and methods for provisioning wireless control of facilities systems are provided. A message is broadcast to a network that includes one or more control devices, which may be associated with one or more control points (e.g., lights in lighting systems). The control device responds with information concerning the control device and/or any associated control points. A scene including at least one specification for operation the control point is assigned to the control device. A corresponding scene command may be generated and sent to the control device. Provisioning may further include generating a visual display of the various control devices and associated control points (e.g., lights) in the facilities system.

20 Claims, 3 Drawing Sheets

U.S. PATENT DOCUMENTS

| | | | |
|---|---|---|---|
| 5,872,429 A | 2/1999 | Xia et al. | |
| 5,905,442 A | 5/1999 | Mosebrook et al. | |
| 5,909,087 A | 6/1999 | Bryde et al. | |
| 5,962,989 A | 10/1999 | Baker | |
| 5,982,103 A | 11/1999 | Mosebrook et al. | |
| 6,025,783 A | 2/2000 | Steffens, Jr. | |
| 6,044,062 A | 3/2000 | Brownrigg et al. | |
| 6,100,653 A | 8/2000 | Lovell et al. | |
| 6,148,306 A | 11/2000 | Seidl et al. | |
| 6,169,377 B1 | 1/2001 | Bryde et al. | |
| 6,184,622 B1 | 2/2001 | Lovell et al. | |
| 6,249,516 B1 | 6/2001 | Brownrigg et al. | |
| 6,252,358 B1 | 6/2001 | Xydis et al. | |
| 6,297,724 B1 | 10/2001 | Bryans et al. | |
| 6,300,727 B1 | 10/2001 | Bryde et al. | |
| 6,301,674 B1 | 10/2001 | Saito et al. | |
| 6,311,105 B1 | 10/2001 | Budike | |
| 6,388,399 B1 | 5/2002 | Eckel et al. | |
| 6,400,280 B1 | 6/2002 | Osakabe | |
| 6,504,266 B1 | 1/2003 | Ervin | |
| 6,535,859 B1 | 3/2003 | Yablonowski et al. | |
| 6,633,823 B2 | 10/2003 | Bartone et al. | |
| 6,640,142 B1 | 10/2003 | Wong et al. | |
| 6,689,050 B1 | 2/2004 | Beutter et al. | |
| 6,700,334 B2 | 3/2004 | Weng | |
| 6,803,728 B2 | 10/2004 | Balasubramaniam et al. | |
| 6,891,838 B1 | 5/2005 | Petite et al. | |
| 6,904,385 B1 | 6/2005 | Budike, Jr. | |
| 6,914,395 B2 | 7/2005 | Yamauchi et al. | |
| 6,914,893 B2 | 7/2005 | Petite | |
| 6,927,546 B2 | 8/2005 | Adamson et al. | |
| 6,990,394 B2 | 1/2006 | Pasternak | |
| 7,006,768 B1 | 2/2006 | Franklin | |
| 7,039,532 B2 | 5/2006 | Hunter | |
| 7,042,170 B2 | 5/2006 | Vakil et al. | |
| 7,045,968 B1 | 5/2006 | Bierman et al. | |
| 7,054,271 B2 | 5/2006 | Brownrigg et al. | |
| 7,079,808 B2 | 7/2006 | Striemer | |
| 7,103,511 B2 | 9/2006 | Petite | |
| 7,167,777 B2 * | 1/2007 | Budike, Jr. | 700/297 |
| 7,199,530 B2 | 4/2007 | Vakil et al. | |
| 7,233,080 B2 | 6/2007 | Garnault et al. | |
| 7,263,073 B2 | 8/2007 | Petite et al. | |
| 7,274,975 B2 | 9/2007 | Miller | |
| 7,307,389 B2 | 12/2007 | Vakil et al. | |
| 7,307,542 B1 * | 12/2007 | Chandler et al. | 340/825.52 |
| 7,333,880 B2 | 2/2008 | Brewster et al. | |
| 7,346,433 B2 | 3/2008 | Budike | |
| 7,349,766 B2 | 3/2008 | Rodgers | |
| 7,352,972 B2 | 4/2008 | Franklin | |
| 7,354,175 B2 | 4/2008 | Culbert et al. | |
| 7,369,060 B2 | 5/2008 | Veskovic et al. | |
| 7,400,226 B2 | 7/2008 | Barrieau et al. | |
| 7,490,957 B2 | 2/2009 | Leong et al. | |
| 7,491,111 B2 | 2/2009 | Ghaly | |
| 7,528,503 B2 | 5/2009 | Rognli et al. | |
| 7,561,977 B2 | 7/2009 | Horst et al. | |
| 7,565,227 B2 | 7/2009 | Richard et al. | |
| 7,571,063 B2 | 8/2009 | Howell et al. | |
| 7,599,764 B2 | 10/2009 | Matsuura et al. | |
| 7,606,639 B2 | 10/2009 | Miyaji | |
| 7,623,042 B2 | 11/2009 | Huizenga | |
| 7,650,425 B2 | 1/2010 | Davis et al. | |
| 7,706,928 B1 | 4/2010 | Howell et al. | |
| 2001/0025349 A1 * | 9/2001 | Sharood et al. | 713/340 |
| 2002/0043938 A1 * | 4/2002 | Lys | 315/149 |
| 2003/0020595 A1 * | 1/2003 | Wacyk | 340/3.5 |
| 2003/0209999 A1 | 11/2003 | Hui et al. | |
| 2004/0002792 A1 * | 1/2004 | Hoffknecht | 700/295 |
| 2004/0051467 A1 | 3/2004 | Balasubramaniam et al. | |
| 2004/0100394 A1 | 5/2004 | Hitt | |
| 2005/0043862 A1 | 2/2005 | Brickfield et al. | |
| 2005/0090915 A1 | 4/2005 | Geiwitz | |
| 2005/0234600 A1 | 10/2005 | Boucher et al. | |
| 2006/0044152 A1 | 3/2006 | Wang | |
| 2006/0142900 A1 | 6/2006 | Rothman et al. | |
| 2006/0215345 A1 | 9/2006 | Huizenga | |
| 2007/0005195 A1 | 1/2007 | Pasquale et al. | |
| 2007/0085700 A1 | 4/2007 | Walters et al. | |
| 2007/0090960 A1 * | 4/2007 | Miki | 340/641 |
| 2007/0271006 A1 | 11/2007 | Golden et al. | |
| 2007/0273307 A1 | 11/2007 | Westrick et al. | |
| 2007/0276547 A1 | 11/2007 | Miller | |
| 2008/0071391 A1 | 3/2008 | Busby et al. | |
| 2008/0133065 A1 | 6/2008 | Cannon et al. | |
| 2008/0167756 A1 | 7/2008 | Golden et al. | |
| 2008/0242314 A1 | 10/2008 | McFarland | |
| 2008/0258633 A1 | 10/2008 | Voysey | |
| 2008/0281473 A1 | 11/2008 | Pitt | |
| 2009/0026966 A1 * | 1/2009 | Budde et al. | 315/152 |
| 2009/0055032 A1 | 2/2009 | Rodgers | |
| 2009/0063257 A1 | 3/2009 | Zak et al. | |
| 2009/0066473 A1 * | 3/2009 | Simons | 340/3.1 |
| 2009/0072945 A1 | 3/2009 | Pan et al. | |
| 2009/0132070 A1 | 5/2009 | Ebrom et al. | |
| 2009/0198384 A1 | 8/2009 | Ahn | |
| 2009/0240381 A1 | 9/2009 | Lane | |
| 2009/0243517 A1 | 10/2009 | Verfuerth et al. | |
| 2009/0248217 A1 | 10/2009 | Verfuerth et al. | |
| 2009/0262189 A1 | 10/2009 | Marman | |
| 2009/0267540 A1 | 10/2009 | Chemel et al. | |
| 2009/0292402 A1 | 11/2009 | Cruickshank | |
| 2009/0292403 A1 | 11/2009 | Howell et al. | |
| 2009/0299527 A1 | 12/2009 | Huizenga et al. | |
| 2010/0114340 A1 | 5/2010 | Huizenga et al. | |
| 2010/0134051 A1 | 6/2010 | Huizenga et al. | |
| 2010/0185339 A1 | 7/2010 | Huizenga et al. | |
| 2010/0191388 A1 | 7/2010 | Huizenga et al. | |

OTHER PUBLICATIONS

Gutierrez, J.A., "On the Use of IEEE Std. 802, 15.4 to enable Wireless Sensor Networks in Building Automation," Dec. 2007, Int'l. Journal of Wireless Information Network, vol. 14, No. 4.

Kintner-Meyer, M. "Opportunities of Wireless Sensors and Controls for Building Operations," Aug.-Sep. 2005, Energy Engineering, vol. 102, No. 5, pp. 27-48.

Montegi, N., Piette, M., Kinney, S., and Herter, K., "Web-Based Energy Information Systems for Energy Management and Demand Response in Commercial Buildings," Apr. 2003, Lawrence Berkeley National Laboratory.

Park, H., Burke, J., and Srivastava, M., "Design and Implementation of a Wireless Sensor Network for Intelligent Light Control," Apr. 2007, IPSN 07.

Sandhu, J.S.S., Agogino, A.M., "Wireless Sensor Networks for Commercial Lighting Control: Decision Making with Multi-Agent Systems," Jul. 2004, Workshop on Sensor Networks.

Sandhu, J.S., Agogino, A.M., and Agogino, A.K., "Wireless Sensor Networks for Commercial Lighting Control: Decision Making with Multi-Agent Systems," 2004, American Association for Artificial Intelligence.

Sekinger, J., "Wireless Lighting Control Technology," Oct. 2005, Phillips NAESCO Midwest Regional Mtgs.

Singhvi, V., Krause, A., Guestrin, C., Garrett, J.H., Matthews, H.S. "Intelligent Light Control Usine Sensor Networks," Nov. 2005, SenSys 2005.

Teasdale, D., Rubinstein, F., Watson, D., and Purdy, S., "Annual Technical Progress Report: Adapting Wireless Technology to Lighting Control and Environmental Sensing," Oct. 2005, Dust Networks, Annual Technical Progress Report.

Wang, D., Arens, E., and Federspiel, C., "Opportunities to same energy and improve comfort by using wireless sensor networks in buildings," Oct. 2003, Proceedings of the third Intl Conference for Enhanced Building Operations.

U.S. Appl. No. 12/912,717, filed Oct. 26, 2010, Charles Huizenga, Sensor Interface for Wireless Control.

U.S. Appl. No. 12/940,902, filed Nov. 5, 2010, Charles Huizenga, Wireless Sensor.

U.S. Appl. No. 12/913,725, filed Oct. 27, 2010, Charles Huizenga, Systems and Methods for Remotely Controlling an Electrical Load.

* cited by examiner

LOCATION-BASED PROVISIONING OF WIRELESS CONTROL SYSTEMS

CROSS-REFERENCE TO RELATED APPLICATIONS

The present application is a continuation and claims the priority benefit of U.S. patent application Ser. No. 12/613,970 filed Nov. 6, 2009 and titled "Automatic Provisioning of Wireless Control Systems," which is a continuation-in-part of U.S. patent application Ser. No. 12/156,621 filed Jun. 2, 2008 and titled "Distributed Intelligence in Lighting Control," the disclosures of which are incorporated herein by reference.

BACKGROUND OF THE INVENTION

1. Field of the Invention

The present invention relates to facilities management. More specifically, the present invention relates to provisioning wireless control systems for facilities management.

2. Description of Related Art

Various resources are provided to an area by facilities systems. Facilities systems may encompass lighting systems, HVAC systems, security systems, fire/safety systems, irrigation systems, agricultural wind systems, blind/louver systems, and the like. The area receiving the resources from facilities systems may include a building, a floor, a room, a group of buildings, etc. Depending on the area, the resources provided, and specific occupant requirements, such facilities systems may include multiple devices of various types. For example, a lighting system for a large building may include several types of lights in various configurations distributed throughout multiple rooms, on multiple floors, etc.

One possible way to manage a facilities system is to provide centralized control of all the devices in such a system. Centralization may allow an individual, such as a facilities manager, to control all the devices of the facilities system from one or a few control interfaces. For example, the facilities manager can turn on all of the lights and/or turn off all of the lights remotely and without having to physically flick each switch on and off in each room. Some disadvantages to a highly centralized control system may include implementation difficulties and inefficiencies. For example, it may be difficult and/or costly to retrofit a large area with a centralized control system.

Centralized control of a facilities system having multiple devices may also be complicated by various factors. For instance, some devices in the system may be subject to different demands than other devices in the system. Using the above example, the lighting system may need to provide more light in certain rooms that do not receive as much natural sunlight as other rooms. As such, high centralization may be inflexible to local conditions and unable to adapt to changing conditions. Further, high centralization may lead to waste. For example, using a highly centralized system to provide adequate resources to the rooms that require it may result in resources being sent to rooms that do not require the same amount of resources. Energy is wasted where resources are provided to areas that do not require such resources.

In contrast, a highly localized facilities control solution presents different disadvantages, such as in the ability to maintain and operate the facilities system. An example of a highly localized control solution is an individual light switch for a light or a group of lights in a particular location. Separate light switches may be distributed throughout a building, floor, etc., and each switch must be separately switched on for its associated device, or group of devices, to be activated. For some areas, this process may be extremely time-consuming. Additionally, separate switches may lead to energy waste when area occupants forget or neglect to switch off each individual switch.

A distributed wireless system may alleviate some of the problems of highly localized and highly centralized systems. One problem with implementing such a system, however, is that most buildings would need to be retrofitted for wireless control. Issues with retrofitting may include reluctance to change or lack of knowledge in implementing such a system. Further, rewiring and/or installing new systems may be costly and difficult to implement.

There is, therefore, a need in the art for improved provisioning for wireless control of facilities systems.

SUMMARY OF THE INVENTION

Exemplary systems, methods, and apparatuses of the present invention provide for provisioning wireless control systems for facilities management. A message is broadcast from a computing device to a wireless communications network that includes one or more control devices. Such control devices may be associated with one or more control points (e.g., lights in lighting systems). In response to the broadcast message, the control device responds with information concerning the control device and/or any associated control points. The information is used to assign a scene to the control device. For example, with respect to a lighting system, such a scene includes at least one specification for operating the lights associated with the control device (e.g., operating at half power). A scene command is generated and sent to the control device.

Various embodiments of the present invention include methods for provisioning wireless control systems for facilities management. A method may include broadcasting a message to a wireless communications network comprising control devices, which may each be associated with one or more lights. Such methods may further include receiving a response from a control device, assigning a scene based on the response, generating a scene command, and transmitting the scene command to the control device. A scene is a set of one or more specifications concerning operation of the one or more lights associated with the control device. Execution of the scene command by the control device results in operation of the lights according to the specifications of the scene.

Various embodiments of the present invention include systems for provisioning wireless control systems for facilities management. An exemplary system may include a memory for storing one or more scenes, a communications interface for broadcasting a message to and receive a response from a wireless communications network including one or more control devices, each of which may be associated with one or more lights. Such systems may further include a processor for assigning a scene to a control device based on the response of the control device and generating a scene command based on the assigned scene. Upon receiving the scene command, the control device may execute the command, which results in operation of the one or more lights associated with the control device. Such operation will be in accordance with the specifications of the scene.

Some embodiments of the present invention include computer media and instructions for provisioning wireless control systems for facilities management. Embodiments may further include instructions for generating visual displays of the control devices and lights in the facilities system.

DETAILED DESCRIPTION

Embodiments of the present invention comprise systems and methods for provisioning wireless control systems for facilities management. A message is broadcast from a computing device to a wireless communications network that includes one or more control devices. Such control devices may be associated with one or more control points (e.g., lights in lighting systems). In response to the broadcast message, the control device responds with information concerning the control device and/or any associated control points. The information is used to assign a scene to the control device. For example, with respect to a lighting system, such a scene includes at least one specification for operating the lights associated with the control device (e.g., operating at half power). A scene command is generated and sent to the control device.

Figure 1:
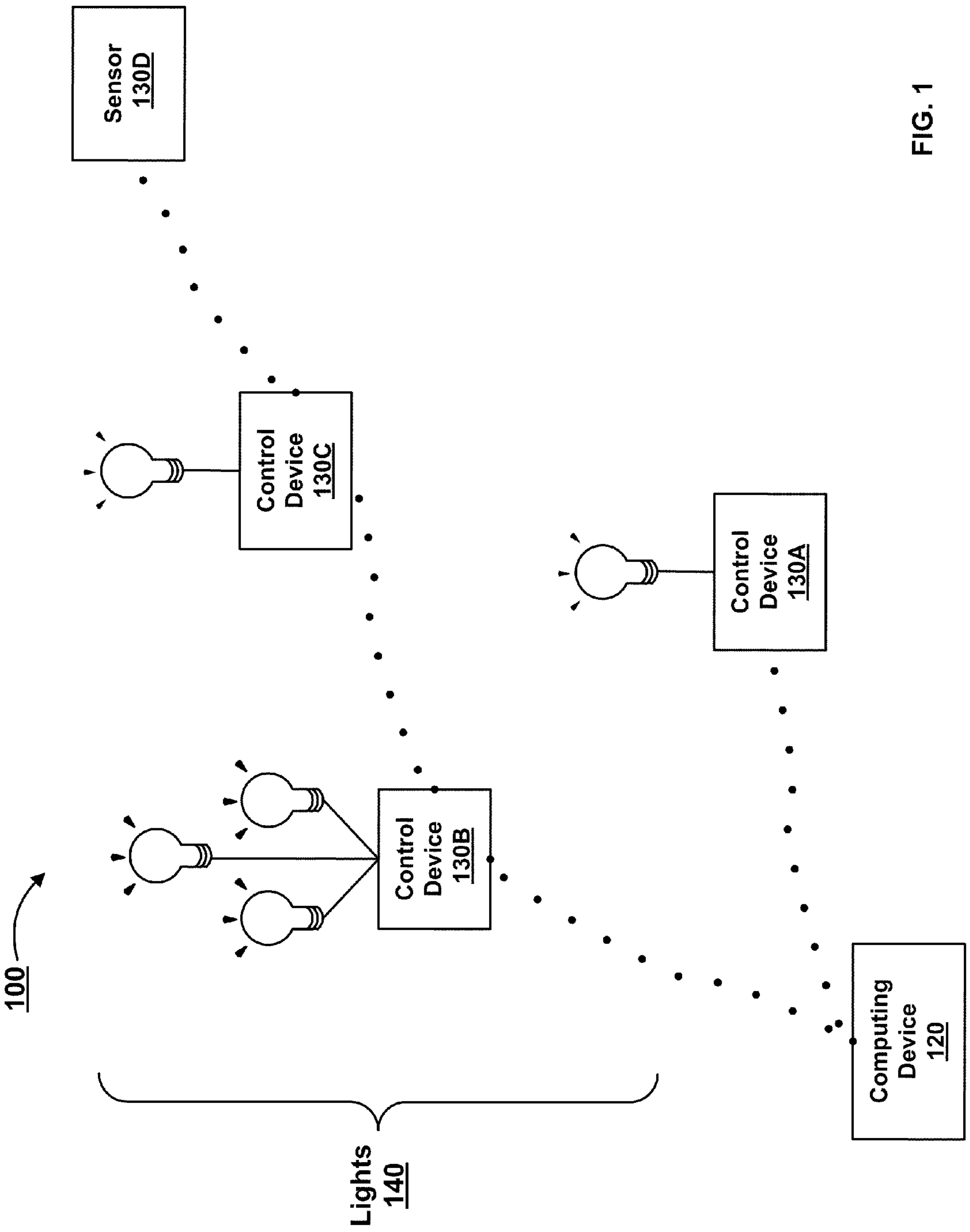
FIG. 1 illustrates an exemplary implementation of a system for provisioning wireless control in a network environment.

FIG. 1 illustrates an exemplary implementation of a system for provisioning wireless control in a wireless communications network 100. Communications network 100 may include computing device 120, one or more control devices 130A-130C, which may be associated with one or more lights, and sensor 130D. Control device 130A, for example, can control the operations of three lights associated with control device 130A, while control device 130B can control the operation of the one light associated with control device 130B. In some embodiments, network 100 may further include a sensor 130D.

The network 100 may be a local, proprietary network (e.g., intranet) and/or may be a part of a larger wide-area network. For example, the network 100 may be a local area network (LAN), which may also be communicatively coupled to a wide area network (WAN) such as the Internet. In some embodiments, the network 100 may be configured to transmit various electromagnetic waves, including, for example, radio signals. Examples of the network 110 may include IEEE 802.11 (Wi-Fi or Wireless LAN) networks, IEEE 802.16 (WiMAX) networks, IEEE 802.16c networks, and the like. Network 100 allows for communication between the various components of system 100. In some instances, network 100 is a multi-hop network.

Computing device 120 may comprise any combination of computer hardware and software configured to receive and transmit information over wireless communication network 100, thereby communicating with various control devices 130A-C or sensor 130D. Computing device 120 may be any type of desktop computer, laptop computer, handheld computer, server, etc. configured to communication over wireless communications network 100. If wireless communications network 100 is a multi-hop network, computing device 120 can broadcast a message to devices within a specified number of hops in the communications network 100.

Computing device 120 uses wireless communications network 100 to communicate with various devices, such as control devices 130A-C or sensor 130D. The control device (e.g., 130A) may be embedded in a fixture, housed within a ballast, in a separate device, etc. As illustrated in FIG. 1, a control device 130A may be associated with one or more light fixtures. Described in further detail in co-pending U.S. patent application Ser. No. 12/156,621 which has incorporated herein by reference, the control device 130A can control the operation of the device or devices (i.e., lights) based on various types of signal information, including signal information sent over the network 100 from computing device 120. Computing device 120 may broadcast a message to devices in the network within a specified number of hops (e.g., two hops). Such a broadcast may be received by control devices 130A-C, but not by sensor 130D.

The control devices 130A-C may be associated with one or more fixtures of a facilities system. In the embodiment illustrated in FIG. 1, such fixtures are light fixtures 140. Also illustrated in FIG. 1 are the associations between the control device 130A with one light, between control device 130B with three lights, and control device 130C with one light.

Figure 2:
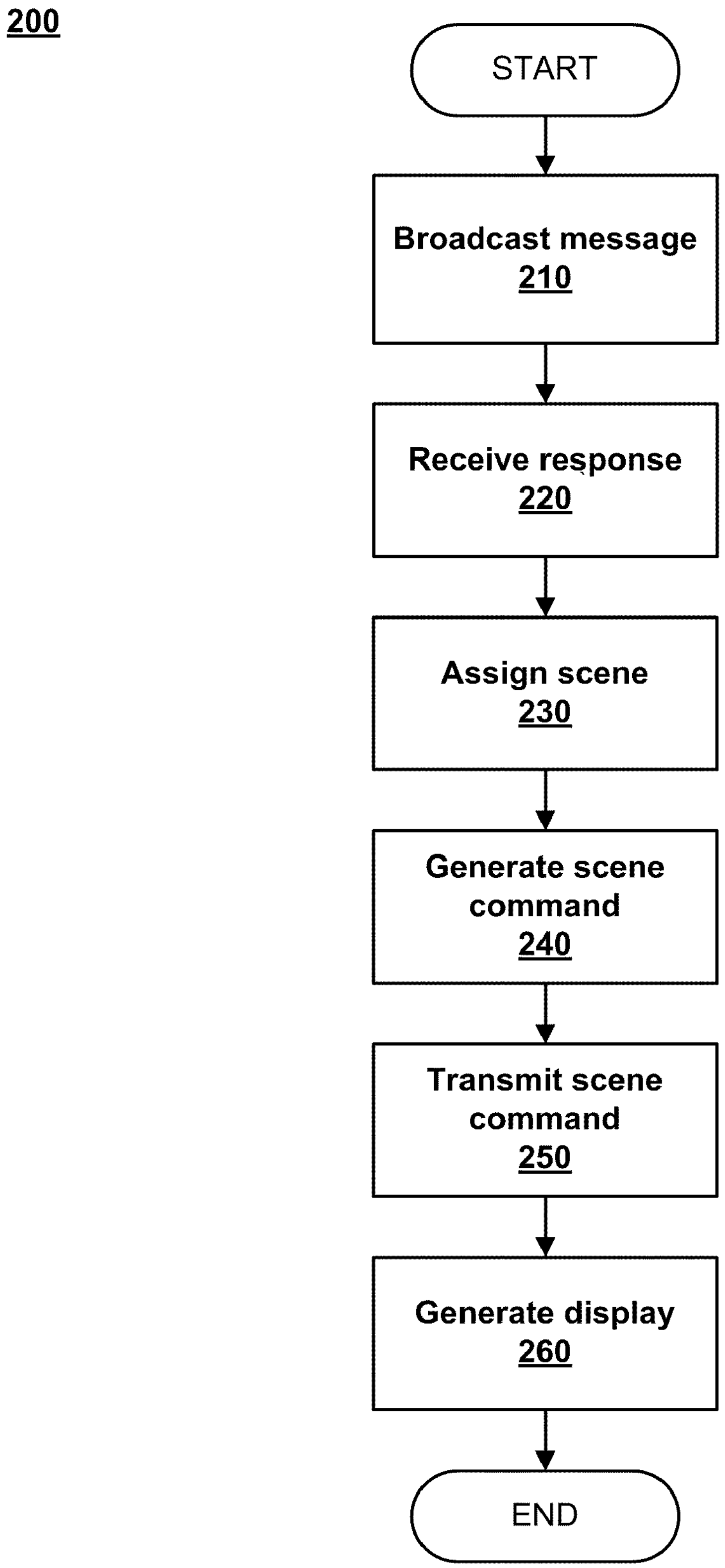
FIG. 2 is a flowchart depicting an exemplary method for provisioning wireless control.

FIG. 2 is a flowchart depicting an exemplary method for provisioning wireless control. In this method, a message is broadcast to the network 100 including one or more control devices, a response is received from a control device, a scene is assigned based on the response, a scene command for the scene is generated and transmitted to the control device. In some embodiments, a visual display is generated concerning the control device and any associated fixtures.

In step 210, a message is broadcast from computing device 120 to a communications network 100 including one or more control devices 130A-C. The message may include a request for information, including location information, number of fixtures or relays, power consumption, etc. In some embodiments, computing device 120 may limit the broadcast to a specified number of hops through wireless communications network 100.

In step 220, a response is received from a control device 130A. Such a response may include location information and the number of associated relays (e.g., three lights). In some cases, the response from control device 130A may include energy consumption, which may be used, for example, to determine that control device 130A is associated with three relays for the three lights. Information regarding current consumption (measured or assigned), voltage, etc., may be used, further, to determine the load of each relay. Identifying the number of relays and unit loads allows for individual control over each relay and load.

In step 230, a scene is assigned to the control device 130A. A scene is a set of one or more specifications concerning operation of the fixtures (e.g., light fixtures) associated with the control device 130A. The assignment is based in part on the information provided by control device 130A in step 220. For example, control device 130A provides a number of relays. The scene may specify that all the relays be operated at full power, half power, or low power. There may also be individual control over each relay, where one relay is operated at full power, and the others are operated at half power, etc. In some embodiments, a sensor 130D may have responded to the message broadcast in step 210. As such, the assignment of the scene to control device 130A may be further based on information provided by a sensor 130D. For example, if control device 130A and sensor 130D are the in the same location, a scene may be assigned to control device 130A in which the operation of the lights is dependent on conditions detected by sensor 130D. Such a scene may include increasing power to full capacity when sensor 130D detects low levels of natural or ambient light.

In step 240, a scene command is generated based on the assigned scene. There may be one or more commands associated with the scene based on the number of relays, the extent of individualized control over each relay, etc. In some embodiments, multiple scenes may be assigned to a control device 130A, in which case multiple scene commands associated with each scene are generated. In some embodiments, a scene command may include commands for cooperation between one or more control devices 130A. For example, controlling the lights in a room may include lights under the control of two different control devices 130B and 130C.

In step 250, the scene command is transmitted to the control device 130A. The scene command is executable by the control device 130A to control operations of the lights associated with control device 130A in accordance with the specification(s) of the assigned scene. Where there are multiple scenes and multiple scene commands assigned to control device 130A, rules or conditions may also be provided to control device 130A for use in determining which scene command(s) to execute at certain time or under a certain set of circumstances.

In an optional step 260, a visual display may be generated based on the responses of the control devices 130A-C or sensor 130D that responded to the message broadcast in step 210. Such a display may reflect location information, such as a spatial distribution of the control devices and any associated lights. Such a display allows a user to view the control devices and associated fixtures. In some embodiments, the user may use the visual display to create and edit scenes, create rules for scenes, etc.

Figure 3:
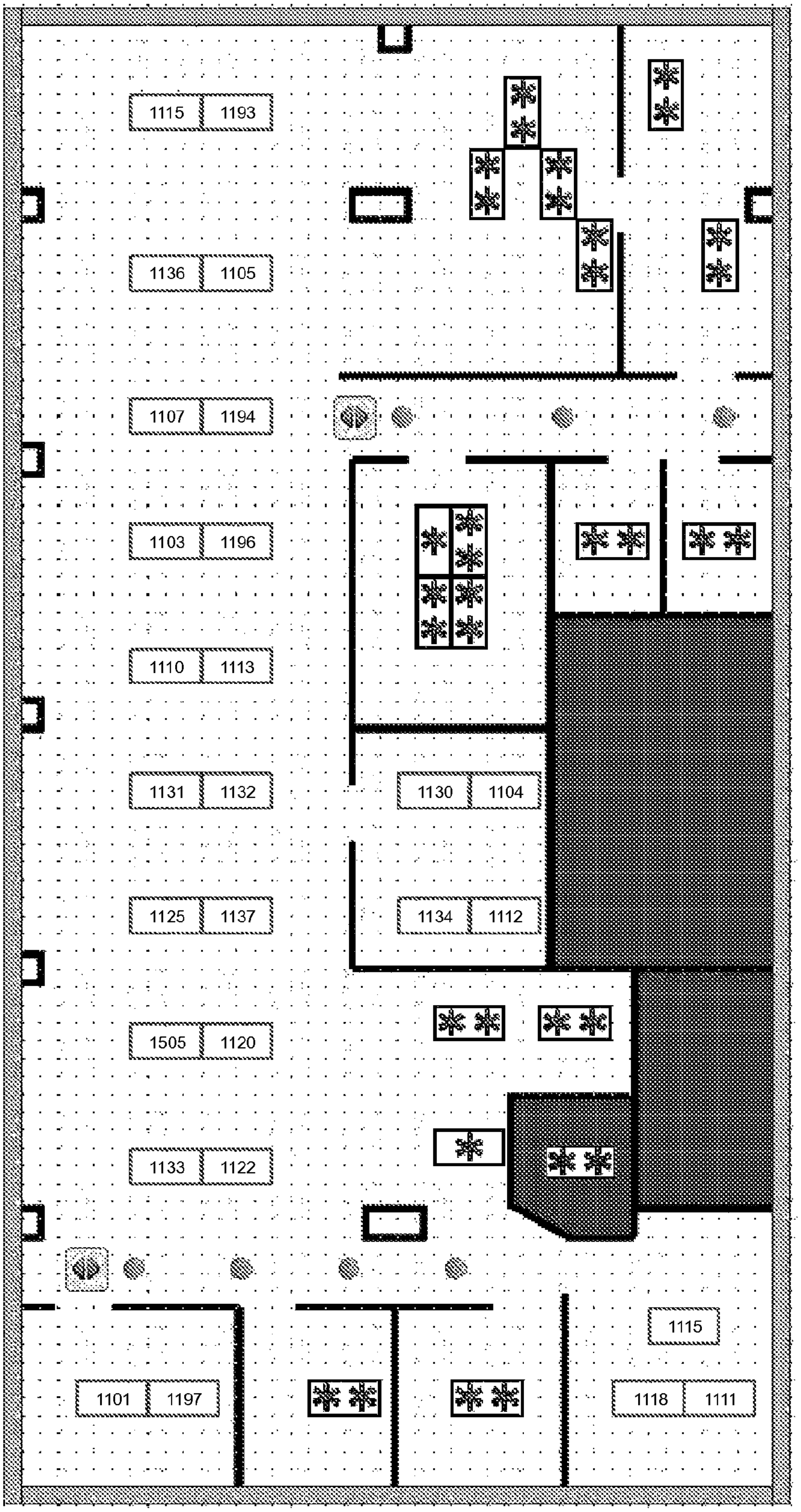
FIG. 3 is an exemplary screenshot of a display generated in provisioning wireless control.

FIG. 3 is an exemplary screenshot of a display generated in provisioning wireless control. An exemplary display may include a plurality of control of devices, each of which may be associated with multiple relays, and each relay may be associated with a number of unit loads. Such a display may illustrate the spatial positioning of devices (and associated relays/loads) in a network and further, be superimposed on a two-dimensional or three-dimensional representation of the building(s), floor(s), room(s), etc. The display may further illustrate the locations of each device in a network. Location data may be provided as latitude, longitude, elevation, and/or x-y-z offsets from a known location.

A particular target device may determine its location in various ways, including use of independent location-aware devices, radio signal triangulation, calculations involving ultrasonic devices, an installation plan identifying devices in a floor plan, and/or location-aware barcode scanning upon installation. For example, an independent location-aware device (e.g., ultrasonic, GPS, A-GPS) can send a message containing the target device location from close proximity, optionally using a directional antenna to the target device.

Location may also be determined by using radio signal strength to triangulate the position of a particular device. The location may be triangulated relative to other devices and/or one or more independent commissioning devices. Independent commissioning devices may also be provided with known location constraints (e.g., from a floor plan or a grid layout) to aid in determination of a location of particular device. Such data may be processed by the commissioning device, and results may be sent via radio frequency network to the target device. Triangulation may also be used with an ultrasonic transmitter in conjunction with two or more receivers with known positions instead of or in addition to the radio signal strength.

Further, location may be determined through use of an installation plan identifying a target device and its location on a scaled floor plan. Such an installation plan can be used to calculate the location of the target device, and the data transmitted via the radio. Such an installation plan may have involved use of a location-aware scanning device. A location-aware scanning device can scan a bar code, for example, of a target device during installation and record the identity and location of the target device. This information can then be transmitted to the device via radio, either immediately or at a later time.

In addition to being used to generate displays, location information may further be used to automatically generate lighting scenes based on a particular distribution of light (e.g., turning off every other light fixture in a hallway). Location information may also be used to assign sensors, switches, etc., to controllers based on proximity and/or relationships to other building features (e.g., walls, floors). For example, all fixtures in a room could be automatically grouped together for control purposes.

Some of the above-described functions can be composed of instructions that are stored on storage media (e.g., computer-readable medium). The instructions may be retrieved and executed by the processor 230. Some examples of storage media are memory devices, tapes, disks, integrated circuits, and servers. The instructions are operational when executed by the processor 230 to direct the processor 230 to operate in accord with the invention. Those skilled in the art are familiar with instructions, processor(s), and storage media.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method of provisioning a wireless control system, the method comprising:

broadcasting a message from a computing device to a wireless communications network comprising one or more control devices, each control device controlling an associated electrical load;

receiving a response at the computing device from one of the control devices in the network, the response including information regarding the control device;

executing instructions stored in memory of the computing device, wherein execution of the instructions by a processor of the computing device:

determines a physical location for the control device based on the received response, and generates a command based on the determined physical location, the command indicating specifications and conditions for operation of the electrical load associated with the control device; and sending the command from the computing device to the control device, wherein the command is stored in a memory of the control device and execution of the command by a processor of the control device controls the operation of the associated electrical load according to the indicated specifications and conditions.

2. The method of claim 1, further comprising generating a visual display illustrating the physical location determined for each control device that responded to the broadcasted message and the associated electrical load.

3. The method of claim 2, wherein generating the visual display includes mapping the physical location of each control device that responded to the broadcasted message, and wherein the mapping is based on a pre-existing floor plan.

4. The method of claim 2, further comprising receiving user input regarding creation or customization of a command, wherein the user input refers to the visual display.

5. The method of claim 1, wherein the electrical load includes one or more lighting devices and further comprising determining a distribution of light based on a spatial distribution of the physical locations of the one or more control devices and the associated lighting devices, wherein generation of the command is further based on the determined distribution of light.

6. The method of claim 1, wherein determining the physical location is further based on information provided by a location-aware device.

7. The method of claim 6, wherein the location-aware device is a barcode scanner configured to scan the control device upon installation of the control device.

8. The method of claim 1, wherein determining the physical location is further based on radio-signal triangulation relative to a transmitter with a known physical location.

9. The method of claim 8, wherein determining the physical location is further based on an ultrasound transmitter.

10. A system of provisioning a wireless control system, the system comprising:

a communications interface of the computing device, the communications interface configured to:

broadcast a message to a wireless communications network comprising one or more control devices, each control device controlling an associated electrical load, and receive a response from one of the control devices in the network, the response including information regarding the control device; and a processor of the computing device, the processor configured to execute instructions stored in memory to:

determine a physical location for the control device based on the received response, and generate a command based on the determined physical location, the command indicating specifications and conditions for operation of the electrical load associated with the control device, wherein the command is stored in a memory of the control device and execution of the command by a processor of the control device controls operation of the associated electrical load according to the indicated specifications and conditions.

11. The system of claim 10, wherein the processor is further executable to generate a visual display illustrating the physical location of the control device and the associated electrical load and further comprising a display device configured to display the visual display generated by the processor.

12. The system of claim 11, wherein generating the visual display includes mapping the physical location of each of the one or more control devices, and wherein the mapping is based on a pre-existing floor plan.

13. The system of claim 11, wherein the communications interface is further configured to receive user input regarding creation or customization of the command, wherein the user input refers to the visual display.

14. The system of claim 10, wherein the electrical load includes one or more lighting devices and wherein the processor is further executable to determine a distribution of light based on the location of the control device and the associated lighting devices, wherein generation of the command is further based on the determined distribution of light.

15. The system of claim 10, wherein the determination of the physical location is further based on information provided by a location-aware device.

16. The system of claim 15, wherein the location-aware device is a barcode scanner configured to scan the control device upon installation of the control device.

17. The system of claim 10, wherein the determination of the physical location is further based on radio-signal triangulation relative to a transmitter with a known physical location.

18. The system of claim 10, wherein the determination of the physical location is further based on an ultrasound transmitter.

19. A non-transitory computer-readable storage medium, having embodied thereon a program, the program being executable by a processor to perform a method of provisioning a wireless control system, the method comprising:

broadcasting a message to a wireless communications network comprising one or more control devices, each control device controlling an associated electrical load;

receiving a response from one of the control devices in the network, the response including information regarding the control device;

determining a physical location for the control device based on the received response;

generating a command based on the determined physical location, the command indicating specifications and conditions for operation of the electrical load associated with the control device; and sending the command to the control device, wherein the command is stored in a memory of the control device and execution of the command by a processor of the control device controls the operation of the associated electrical load according to the indicated specifications and conditions.

20. The non-transitory computer-readable storage medium of claim 19, wherein the electrical load includes one or more lighting devices and further comprising instructions executable to determine a distribution of light based on the location of the control device and the associated lighting devices, wherein generation of the command is further based on the determined distribution of light.

* * * * *